(12) United States Patent
Jourden

(10) Patent No.: US 11,739,817 B2
(45) Date of Patent: Aug. 29, 2023

(54) REDUCED VIBRATION, SHIFT COMPENSATING, CONTINUOUSLY VARIABLE TRANSMISSION

(71) Applicant: Keith Nicholas Jourden, Mililani, HI (US)

(72) Inventor: Keith Nicholas Jourden, Mililani, HI (US)

( * ) Notice: Subject to any disclaimer, the term of this patent is extended or adjusted under 35 U.S.C. 154(b) by 0 days.

(21) Appl. No.: 17/576,603

(22) Filed: Jan. 14, 2022

(65) Prior Publication Data

US 2023/0228319 A1    Jul. 20, 2023

(51) Int. Cl.
*F16H 9/24* (2006.01)
*F16H 55/30* (2006.01)

(52) U.S. Cl.
CPC .............. *F16H 9/24* (2013.01); *F16H 55/30* (2013.01); *F16H 2055/306* (2013.01)

(58) Field of Classification Search
CPC ....... F16H 9/24; F16H 55/30; F16H 2055/306
USPC ........................................................ 474/155
See application file for complete search history.

(56) References Cited

U.S. PATENT DOCUMENTS

| 724,450 | A | * | 8/1902 | Dumaresq | |
| 6,626,780 | B2 | * | 9/2003 | Fragnito | ................... F16H 9/24 |
| | | | | | 474/54 |
| 2012/0238384 | A1 | * | 9/2012 | Lee | ........................... F16H 9/10 |
| | | | | | 474/25 |

FOREIGN PATENT DOCUMENTS

| CN | 102094945 A | * | 6/2011 | ............... F16H 9/10 |
| JP | 2000154852 A | * | 6/2000 | .......... F16F 15/1232 |
| WO | WO-2012011739 A2 | * | 1/2012 | ............. F16H 55/54 |

* cited by examiner

*Primary Examiner* — Gene O Crawford
*Assistant Examiner* — Emily R Kincaid
(74) *Attorney, Agent, or Firm* — Martin E. Hsia; Keri Ann K. S. Krzykowski

(57) ABSTRACT

An improvement to continuously variable transmissions whereby power is transmitted from a driver axle to a driven axle through a variable transmission mechanism. A plurality of unidirectional sprocket wheels positioned radially around a driver axle within a set of frustoconical members is provided so that the distance from the driver axle can be adjusted. The unidirectional sprocket wheels are connected by a chain to a similar driven axle portion. This low vibration, high torque capable transmission is superior to variable transmissions that rely on friction-based power transmissions that can slip during operation.

3 Claims, 10 Drawing Sheets

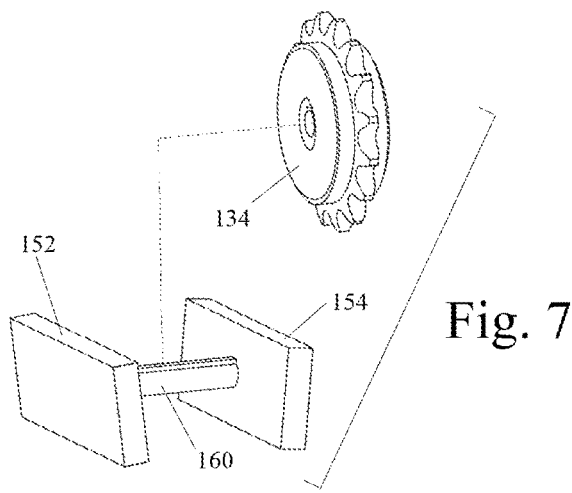
Fig. 7
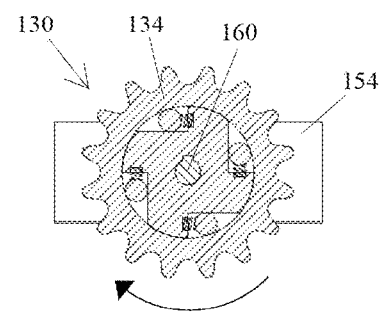
Fig. 8
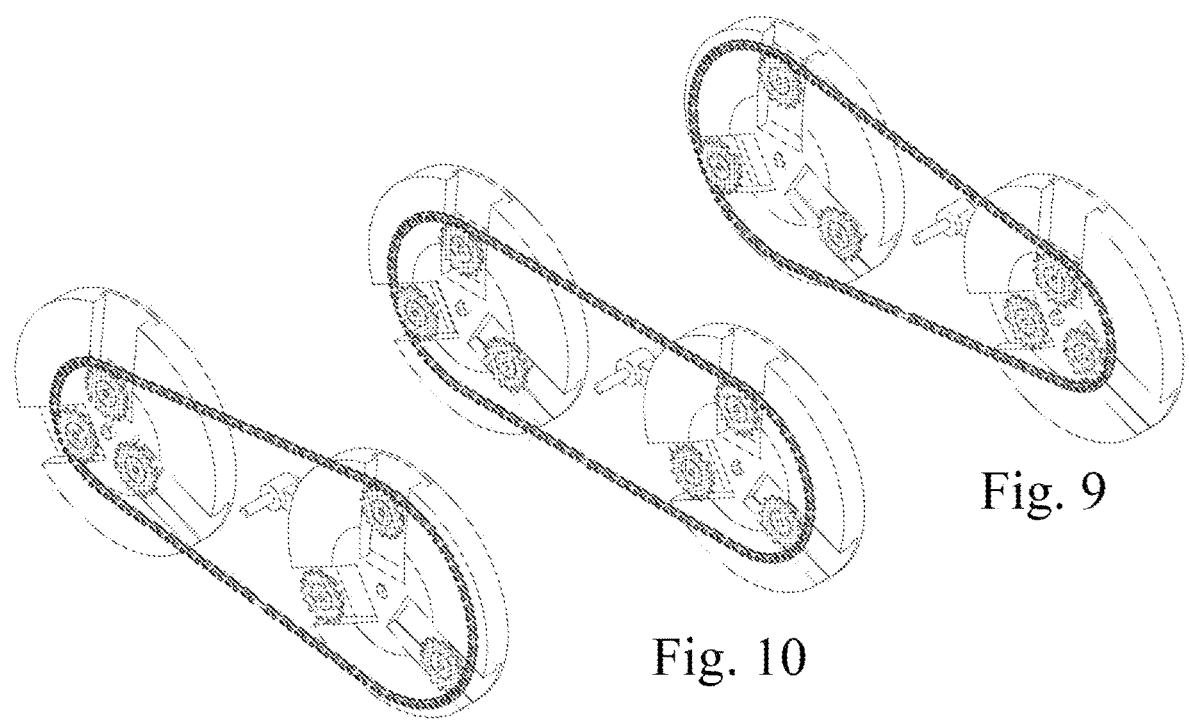
Fig. 9
Fig. 10
Fig. 11

REDUCED VIBRATION, SHIFT COMPENSATING, CONTINUOUSLY VARIABLE TRANSMISSION

TECHNICAL FIELD

The present invention relates to a continuously variable transmission, and more specifically to a high torque continuously variable transmission that is not dependent on friction.

BACKGROUND ART

There is an unfulfilled need for a durable, efficient, and simple continuously variable transmission capable of operating under high amounts of stress and able to transfer large amounts of power and torque. Conventional transmissions provide multiple fixed gear ratios, so that it is often not possible to provide the optimal transmission ratio to maximize output power for the speed of the engine and the speed of the vehicle. This results in a problem in that, as the vehicle changes speed, the engine speed cannot be maintained at the speed of highest power or efficiency, causing increases in power use and fuel consumption, as well as a shock to the transmission and vehicle when shifting between the fixed gear ratios, which can damage the transmission, because of high torque input power.

There are also some currently produced continuously variable transmissions that rely on friction for power transfer, with transmission belts engaged with and transversely movable over conical components, resulting in uncertain power transmission due to sudden slipping, large amounts of wear causing slippage or machine failure, and large power losses. Some more complex friction-based variable transmissions can also be very heavy, thus decreasing simplicity, reliability, and efficiency, while adding cost.

U.S. Pat. No. 724450 to Dumaresq, incorporated herein by reference, discloses a variable speed gear comprising drums having a series of bearings each carrying sprocket wheels or pulley wheels which are capable of being radially moved toward or away from the center and over which the transmission chain or cord passes.

Japanese Patent Application 2002-250420A to Fujisawa, incorporated herein by reference, discloses a variable transmission consisting of a plurality of sprockets on both the input side and the output side and a mechanism that can change the pitch circumference length for each sprocket on the input side, and simultaneously change the output side. The mechanism for radially adjusting the position of sprockets is a slide device which utilizes bevel gears and a driving device to operate.

U.S. Pat. No. 6,626,780 to Fragnito, incorporated herein by reference, discloses a cone shaped member with two spiral grooved shafts and keyed sprockets, which utilize a sliding alignment guide which can laterally slide along the cone shaped member. A chain interlinks the teeth of the driving sprocket and cradles the outside surface of the cone shaped member.

Japanese Patent Application 2004-183877A to Kogahara, incorporated herein by reference, discloses a variable transmission mechanism that consists of a plurality of sprockets provided around the input shaft so that the distance from the input shaft can be adjusted, and a part of each of the plurality of sprockets is exposed to the outside, within a cone provided with a plurality of slits. The sprockets rely on support by sprocket support members. A chain is provided connecting the input to a similar output shaft-related portion with a plurality of sprockets exposed to the outside of the cone.

Korean Patent Application 2012-0010629A to Jeong, incorporated herein by reference, discloses a variable transmission comprising a belt or chain and a plurality of unidirectional wheels radially disposed around an axle. A rotation radius adjusting device and a variable disk are also provided.

Korean Patent Application 2014-006210W to Byeon, incorporated herein by reference, discloses input variable shafts with incorporated unidirectional sprockets or gears provided radially around the shaft assemblies and a similar output variable shaft, connected by a chain or belt, where the distance of the sprockets around the input and output shafts can be manipulated to increase or decrease the distance from their respective shaft. The assembly comprises guide plates, guide grooves, guide rods, a coupling pulley and fixing boards.

Typically, the approach to high torque or positively engaged variable transmissions utilizing input (driver) and output (driven) shafts or axles with radially disposed sprockets or gears is to employ a design using unidirectional or rotatable sprockets that allows for adjustment of the position of the chain during shifting (Dumaresq, Fujisawa, Kogahara, Jeong, Byeon) or a more complicated design incorporating manually turned sprockets (Fragnito).

One other major characteristic of these designs is the use of a cone mounted on the input or output shaft or axle (Fragnito, Kogahara) or a set of conical members (Jeong) or a more complicated mechanism incorporating a combination of conical members and flat disks (Byeon).

A key function of these mechanisms is to actuate sprockets or gears radially disposed around an input shaft or output shaft (for simplicity, in the remainder of this patent, shafts and axles will both be referred to as "axles", and "input" will mean "driver", and "output" will mean "driven") to move radially closer to or further from the axle around which the sprockets or gears are set, thus decreasing or increasing the diameter of the chain wrapped around the sprockets or gears.

In some cases the shape of a cone is used, with the sprockets or gears being moved laterally along the axis of the cone to adjust the position of the sprockets as well as the diameter of the chain (Fragnito, Kogahara).

In designs that utilize conical disks or a combination of conical elements and flat disks (Jeong, Byeon), the position of the sprockets can be adjusted by pushing two members together to increase the distance of the sprockets from the shaft or axle, or to pull the members apart, thus decreasing the distance of the sprockets from the shaft or axle (Jeong, Byeon).

In designs that do not use a conical element, a separate actuation mechanism is used to adjust the position of the sprockets disposed around the shaft or axle (Dumaresq, Fujisawa).

The previously used designs for the utilization of conical or other elements come with their own respective sets of problems. Those that use a cone mounted on a shaft or axle, with sprockets moving axially along the conical member to adjust position and chain diameter, will have a problem in that the single conical member that the chain rests on does not evenly support the chain, thus causing increased wear, friction, and loss of efficiency and could cause problems with the chain merging correctly with the sprockets. These designs also require a sprocket support member or alignment guide (Fragnito, Kogahara).

Within the aforementioned devices that use conical disks or a combination of conical members and flat disks (Jeong, Byeon), or do not utilize a conical member (Dumaresq, Fujisawa), problems will occur due to the chain not being supported in a rounded shape on both sides by conical members. Due to the resulting polygonal shape of the chain, these devices will have large amounts of vibration that will decrease efficiency, cause wear and excessive noise, can dislodge the chain from the sprockets, cause inconsistent power output and will increase the possibility of damaged components or machine failure, and may require a dampener, tensioner, or vibration absorber to operate.

There can also be problems when shifting at a standstill, in the case of a use that requires a precise difference in engagement between input power and output power, such as a vehicle shifting gear ratios when at a stop. In this case, shifting must be able to occur without either the input (driver) or output (driven) shafts or axles turning. Designs of prior variable transmissions using the mechanisms described above are unable to compensate for chain movement and rotation of the transmission axles while shifting gear ratios, and as a result will not evenly disperse the chain around the mechanism during shifting or may have uneven amounts of power delivery as a result, and thus eventually become damaged or experience machine failure.

There is therefore a need for a continuously variable transmission with a design that evenly supports the chain or belt on both sides, and prevents unnecessary friction or wear, enabling smooth power delivery and an efficient design.

There is also a need for a design that functions with minimal or no vibration, which requires that the chain or belt be kept in a rounded (not polygonal) shape to maintain consistent length and power delivery, and to minimize vibration during operation.

There is also a need for a mechanism to effectively enable the chain to evenly disperse around the sprockets during gear shifts, alleviate chain tension, and further enable smooth power delivery. This would be especially important in designs that require consistency and precision between the input (driver) and output (driven) axles when gear ratio shift occurs, such as the previously mentioned scenario of a vehicle shifting gear ratios while at a stop.

Furthermore, there is a need for a continuously variable transmission that has the ability to transfer large amounts of power and torque that is not limited by friction, possesses a simple structure that is easy to manufacture, and has a lightweight design.

Accordingly, it is an object of the present invention to provide a continuously variable transmission that meets all of these needs.

DISCLOSURE OF THE INVENTION

The above and other objects are achieved by the present invention, a first presently preferred embodiment of which is a continuously variable transmission, comprising a driver axle with a pair of driver assembly substantially frustoconical members, each having a narrower end and a lateral surface having a plurality of radially spaced substantially radially extending guide railing slots, coaxially mounted and axially slidable on the driver axle. The narrower ends are facing each other to form a driver assembly, so that the lateral surfaces of the driver frustoconical members define a driver circumferential valley therebetween, having driver valley sides with corresponding guide railing slots opposing each other on each of the driver valley sides. In this manner, sliding one of the driver assembly frustoconical members along the driver axle changes separation between corresponding guide railing slots. This embodiment also has a driven axle parallel to and spaced apart from the driver axle, with a pair of driven assembly substantially frustoconical members, each having a narrower end and a lateral surface having a plurality of radially spaced substantially radially extending guide railing slots, coaxially mounted and axially slidable on the driven axle. The narrower ends are facing each other to form a driven assembly, so that the lateral surfaces of the driven frustoconical members define a driven circumferential valley therebetween, having driven valley sides with corresponding guide railing slots opposing each other on each of the driven valley sides. In this manner, sliding one of the driven assembly frustoconical members along the driven axle changes separation between corresponding guide railing slots. The driver circumferential valley and the driven circumferential valley are approximately coplanar. A plurality of unidirectional sprocket wheels having teeth, each having a wheel diameter, is each mounted substantially coplanar with the circumferential valleys on guide plates receivable in and slidable along corresponding guide railing slots when the frustoconical members slide along the axles. Preferably, the unidirectional sprocket wheels on the driver assembly rotate only in the same direction as the driver axle, and the unidirectional sprocket wheels on the driven assembly rotate only in the opposite direction as the driver axle. In this manner, axially sliding frustoconical members of one of the assemblies changes separation of corresponding guide railing slots on that assembly and causes guide plates to slide along the guide railing slots and changes radial separation between all of the sprocket wheels mounted on the guide plates for the assembly. A chain made of interlocking movable links having chain sides defining a chain width has the links engaged with radially outward of the teeth (meaning the teeth radially outward from the axle on which the frustoconical member on which the sprocket wheels are mounted) on the sprocket wheels that extend radially outward from the circumferential valleys as the sprocket wheels rotate. In this manner, the chain sides bear against the valley sides and the chain engages only with radially outward of the teeth of the unidirectional sprocket wheels as the sprocket wheels rotate, whereby the chain forms a substantially circular arc within the circumferential valleys, and the valley sides prevent the chain from extending straight from the radially outward of the teeth of one sprocket wheel to radially outward of the teeth of an adjacent sprocket wheel, even though the radially outward teeth of the sprocket wheels are engaged with the links of the chain, so that vibration from different sprocket wheels engaging with links of the chain as the assemblies rotate is reduced.

Preferably, transmission actuators are operably connected to the frustoconical members to simultaneously axially slide the frustoconical members in the driver assembly together and apart along the driver axle, and to axially slide the frustoconical members in the driven assembly together and apart along the driven axle, in opposite directions by engagement-maintaining amounts necessary to keep length of the chain extending over the radially outward teeth of the sprocket wheels mounted on both assemblies substantially constant, in order to maintain engagement of the chain over the radially outward teeth as the frustoconical members are axially slid along the axles and the sprocket wheels rotate. In this manner, actuating the transmission actuators changes radial separation (from the axle on which the frustoconical member on which the sprocket wheels are mounted) of the radially outward of the teeth of the sprocket wheels for the driver assembly and the driven assembly in opposite directions by tensioning amounts necessary to maintain substantially constant tension in the chain while the links are engaged on the radially outward teeth, as gear ratios between the driver axle and the driven axle are changed.

In another presently preferred embodiment, the invention comprises a driver axle, a pair of driver assembly substantially frustoconical members, each having a narrower end and a lateral surface, coaxially mounted and axially slidable on the driver axle, with the narrower ends facing each other to form a driver assembly, so that the lateral surfaces of the driver frustoconical members define a driver circumferential valley therebetween, having driver valley sides. In this manner, axially sliding one of the driver assembly frustoconical members along the driver axle changes separation of the driver valley sides. This embodiment also has a driven axle parallel to and spaced apart from the driver axle and a pair of driven assembly substantially frustoconical members, each having a narrower end and a lateral surface, coaxially mounted and axially slidable on the driven axle, with the narrower ends facing each other to form a driven assembly, so that the lateral surfaces of the driven frustoconical members define a driven circumferential valley therebetween, having driven valley sides, so that axially sliding one of the driven assembly frustoconical members along the driven axle changes separation of the driven valley sides. The driver circumferential valley and the driven circumferential valley are approximately coplanar. A plurality of radially spaced unidirectional sprocket wheels having teeth, each having a wheel diameter is each slidably mounted on the valley sides of the frustoconical members of the assemblies to slide substantially radially, so that axially sliding the frustoconical members in an assembly changes radial separation between all of the sprocket wheels mounted on that assembly. Preferably, the unidirectional sprocket wheels mounted on the driver assembly rotate only in the same direction as the driver axle, and the unidirectional sprocket wheels mounted on driven assembly rotate only in the opposite direction as the driver axle. A chain made of interlocking movable links having a chain length, and chain sides defining a chain width, has the links engaged with radially outward of the teeth on the sprocket wheels that extend radially outward from the circumferential valleys as the sprocket wheels rotate. The chain sides bear against the valley sides and the links of the chain engage only with radially outward of the teeth of the unidirectional sprocket wheels, so that the chain forms a substantially circular arc within the circumferential valleys and the valley sides prevent the chain from extending straight from the radially outward teeth of one sprocket wheel to the radially outward teeth of an adjacent sprocket wheel, even though the radially outward teeth of the sprocket wheels are engaged with the links of the chain, so that vibration from different sprocket wheels engaging with the chain as the assemblies rotate is reduced. Preferably, transmission actuators are operably connected to the frustoconical members to simultaneously axially slide the frustoconical members in the driver assembly together and apart along the driver axle and to axially slide the frustoconical members in the driven assembly together and apart along the driven axle, in opposite directions by engagement-maintaining amounts necessary to keep the length of the chain extending over the radially outward teeth of the sprocket wheels mounted on both assemblies substantially constant, in order to maintain engagement of the chain over the radially outward of the teeth as the frustoconical members are axially slid along the axles and the sprocket wheels rotate. In this manner, actuating the transmission actuators changes radial separation of the radially outward teeth of the sprocket wheels for the driver assembly and the driven assembly in opposite directions by tensioning amounts necessary to maintain substantially constant tension in the chain while the links are engaged on the radially outward teeth, as gear ratios between the driver axle and the driven axle are changed.

In another presently preferred embodiment, the invention comprises a driver axle, a pair of driver assembly substantially frustoconical members, each having a narrower end and a lateral surface, coaxially mounted and axially slidable on the driver axle, with the narrower ends facing each other to form a driver assembly, so that the lateral surfaces of the driver frustoconical members define a driver circumferential valley therebetween, having driver valley sides, so that axially sliding one of the driver assembly frustoconical members along the driver axle changes separation of the driver valley sides. This embodiment also has a driven axle parallel to and spaced apart from the driver axle, a pair of driven assembly substantially frustoconical members, each having a narrower end and a lateral surface, coaxially mounted and axially slidable on the driven axle, with the narrower ends facing each other to form a driven assembly, so that the lateral surfaces of the driven frustoconical members define a driven circumferential valley therebetween, having driven valley sides, so that axially sliding one of the driven assembly frustoconical members along the driven axle changes separation of the driven valley sides. The driver circumferential valley and the driven circumferential valley are approximately coplanar. A plurality of radially spaced unidirectional structurally engageable wheels, each having a wheel diameter and engagement portions that extend radially outward from the circumferential valleys as the unidirectional structurally engageable wheels rotate, is each slidably mounted on the valley sides of the frustoconical members of the assemblies to slide substantially radially, so that axially sliding the structurally engageable frustoconical members in an assembly changes radial separation between all of the structurally engageable wheels mounted on the assembly. Preferably, the unidirectional structurally engageable wheels mounted on the driver assembly rotate only in the same direction as the driver axle and the unidirectional structurally engageable wheels mounted on the driven assembly rotate only in the opposite direction as the driver axle. A structurally engageable belt having belt sides defining a belt width and a belt length, is structurally engaged with the engagement portions. In this manner, the belt sides bear against the valley sides and the belt engages only with radially outward of the engagement portions of the unidirectional structurally engageable wheels as the unidirectional structurally engageable wheels rotate, so that the belt forms a substantially circular arc within the circumferential valleys and the valley sides prevent the belt from extending straight from the radially outward engagement portions of one structurally engageable wheel to radially outward engagement portions of an adjacent structurally engageable wheel, even though the radially outward engagement portions of the structurally engageable wheels are engaged with the belt, whereby vibration from different structurally engageable wheels engaging with the belt as the assemblies rotate is reduced. Preferably, transmission actuators are operably connected to the frustoconical members to simultaneously axially slide the frustoconical members in the driver assembly together and apart along the driver axle and to axially slide the frustoconical members in the driven assembly together and apart along the driven axle, in opposite directions by engagement-maintaining amounts necessary to keep length of the belt extending over radially outward engagement portions of the structurally engageable wheels mounted on both assemblies substantially constant, in order to maintain engagement of the belt over the radially outward engagement portions as the frustoconical members are axially slid along the axles and the unidirectional structurally engageable wheels rotate. In this manner, actuating the transmission actuators changes radial separation of the radially outward engagement portions of the structurally engageable wheels for the driver assembly and the driven assembly in opposite directions by tensioning amounts necessary to maintain substantially constant tension in the belt engaged on the radially outward engagement portions, as gear ratios between the driver axle and the driven axle are changed.

In another presently preferred embodiment of the present invention, the structurally engageable belt, the engagement portions, and the structurally engageable wheel are selected from the group consisting of a belt having teeth and wheels having holes complementary to the teeth to receive and engage with the teeth, and a chain having links and sprocket wheels having teeth complementary to the links to receive and engage with the links.

In another presently preferred embodiment of the present invention, the transmission actuators comprise a single actuator.

In another presently preferred embodiment of the present invention, the invention further comprises a shift compensator compensatably drivably rotatably connected to an ultimate axle, to compensate for rotation of the ultimate axle due to rotation of the driver axle or the driven axle due to shifting of gear ratios between these axles, and an actuatable clutch to selectively engage and disengage the shift compensator from being drivably rotatably connected to at least one of the driver axle and the driven axle.

In another presently preferred embodiment of the present invention, the shift compensator comprises a primary axle, having a segment with helical grooves, drivably rotatably connected to the actuatable clutch, a helically slidable gear having helical splines complementary to the helical grooves, mounted on the primary axle and helically slidably engaged with the helical grooves, and also axially slidable along, and rotatably driving, the ultimate axle, so that rotating the primary axle helically slides the helically slidable gear axially along the helical grooves of the primary axle and vice versa. This embodiment further comprises a compensating actuator to helically slide the helically slidable gear along the helical grooves of the primary axle and a compensating controller controllably connected to the compensating actuator. In this manner, when the actuatable clutch engages at least one of the driver axle and the driven axle with the shift compensator, the compensating controller causes the compensating actuator to helically slide the helically slidable gear along the helical grooves to absorb rotation of one of the driver axle and the driven axle due to shifting of the gear ratios between the axles, while maintaining positive rotational engagement between the driver axle or the driven axle, and with the ultimate axle.

In another presently preferred embodiment, the invention comprises a primary axle, having a segment with helical grooves, drivably rotatably connected to the actuatable clutch, a helically slidable cylinder having helical splines complementary to the helical grooves, mounted on the primary axle and helically slidably engaged with the helical grooves, and also axially slidable along, and rotatably driving, the ultimate axle, so that wherein rotating the primary axle helically slides the helically slidable cylinder axially along the helical grooves of the primary axle and vice versa. This embodiment further comprises a compensating actuator to helically slide the helically slidable cylinder along the helical grooves of the primary axle, and a compensating controller controllably connected to the compensating actuator, so that, when the actuatable clutch engages at least one of the driver axle and the driven axle with the shift compensator, the compensating controller causes the compensating actuator to helically slide the helically slidable cylinder along the helical grooves to absorb rotation of one of the driver axle and the driven axle due to shifting of the gear ratios between the axles, while maintaining positive rotational engagement between the driver axle or the driven axle, and with the ultimate axle.

In another presently preferred embodiment, the invention comprises a continuously variable transmission in which at least one of the unidirectional sprocket wheels comprises multiple coaxial wheelets, each having the wheel diameter and the teeth, with the wheelets being rotatable with respect to each other by at least an offset distance between adjacent teeth on the gears, wherein the teeth on at least some of the wheelets are biased to be rotationally offset from the teeth of others of the wheelets by at most half of the offset distance, so that when the links on the chain engage with the teeth on the wheelets, the wheelets overcome the bias and the wheelets rotate until the teeth become substantially aligned.

In another presently preferred embodiment, at least one of the unidirectional structurally engageable wheels comprises multiple coaxial wheelets, each having the wheel diameter and the engagement portions, the wheelets being rotatable with respect to each other by at least an offset distance between adjacent engagement portions. Preferably, the engagement portions of at least some of the wheelets are biased to be rotationally offset from the engagement portions of others of the wheelets by at most half of the offset distance. In this manner, when the belt engages with the engagement portions on the wheelets, the wheelets overcome the bias and the wheelets rotate until the engagement portions become substantially aligned.

BRIEF DESCRIPTION OF DRAWINGS

FIG. 7 is an exploded view of a driver axle unidirectional sprocket assembly 130.

FIG. 8 is a left sectional view of a driver axle unidirectional sprocket assembly 130 wherein the movements of the unidirectional sprocket wheel 134 are shown.

FIG. 9 is a perspective view of the embodiment of FIG. 4 in which the variable transmission is positioned to show a low gear ratio.

FIG. 10 is a perspective view of the embodiment of FIG. 4 in which the variable transmission is positioned to show a medium gear ratio.

FIG. 11 is a perspective view of the embodiment of FIG. 4 in which the variable transmission is positioned to show a high gear ratio.

Figure 1:
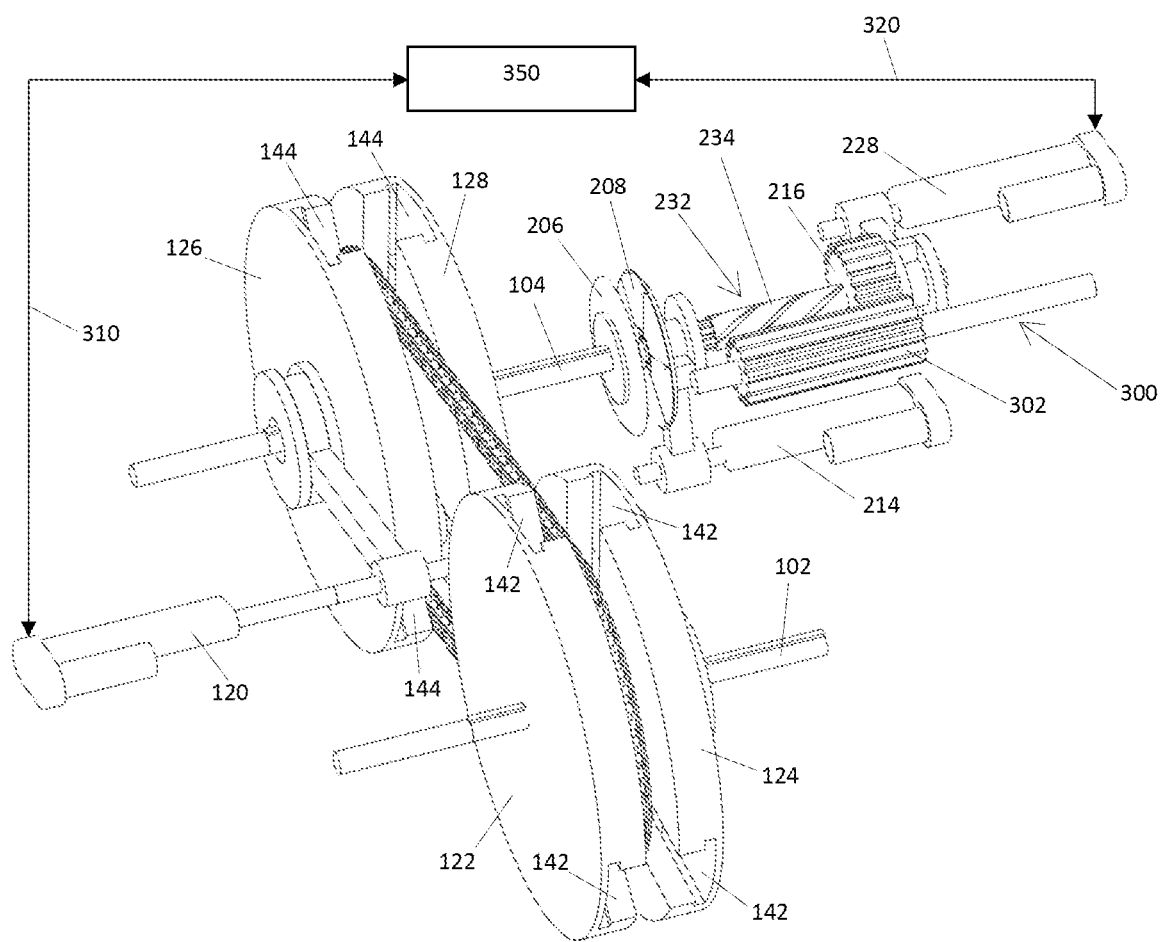
FIG. 1 is an assembled perspective view of a presently preferred embodiment of the continuously variable transmission and the shift compensator of the present invention.

It is presently preferred that the invention is practiced by using both the continuously variable transmission and a paired shift compensator, presently illustrated by way of example as shown in FIG. 1.

The objectives described above, as well as other objectives, are met by a continuously variable transmission which comprises assemblies of frustoconical members mounted on axles.

A frustoconical member is a member in substantially the shape of a truncated cone. The lateral surface of a frustoconical member is all the sides, excluding the base and top, of the frustoconical member. A frustoconical member has a narrower end, referred to as the top, and a wider end, referred to as the base.

Figure 3:
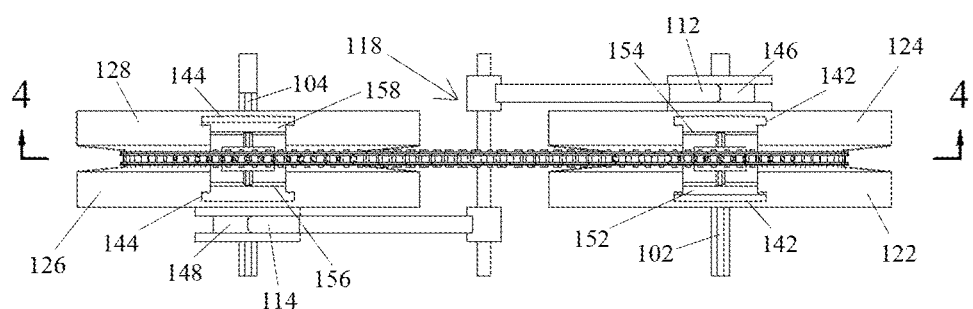
FIG. 3 is a top plan view of the variable transmission with the transmission actuator omitted for clarity.

Referring to FIG. 1, preferably the variable transmission driver axle assembly comprises a driver axle 102 and a pair of driver assembly frustoconical members 122 and 124, with each having a narrower end and a lateral surface, mounted and slidable along the driver axle 102, and with the narrower ends facing each other to form a driver assembly. The lateral surfaces of the driver assembly frustoconical members 122 and 124 together form a driver circumferential valley in the space between, as can be seen in FIG. 3. Axially sliding one of the driver assembly frustoconical members 122 and 124 along the driver axle 102 changes separation of the driver valley sides.

The variable transmission driver axle assembly comprises a driven axle 104 parallel to and spaced apart from the driver axle 102 and a pair of driven assembly frustoconical members 126 and 128, with each having a narrower end and a lateral surface, mounted and slidable along the driven axle 104, and with the narrower ends facing each other to form a driven assembly. The lateral surfaces of the driven assembly frustoconical members 126 and 128 together form a driver circumferential valley in the space between. Axially sliding one of the driven assembly frustoconical members 126 and 128 along the driven axle 104 changes separation of the driven valley sides.

The driver circumferential valley and the driven circumferential valley are preferably approximately aligned with each other.

Figure 2:
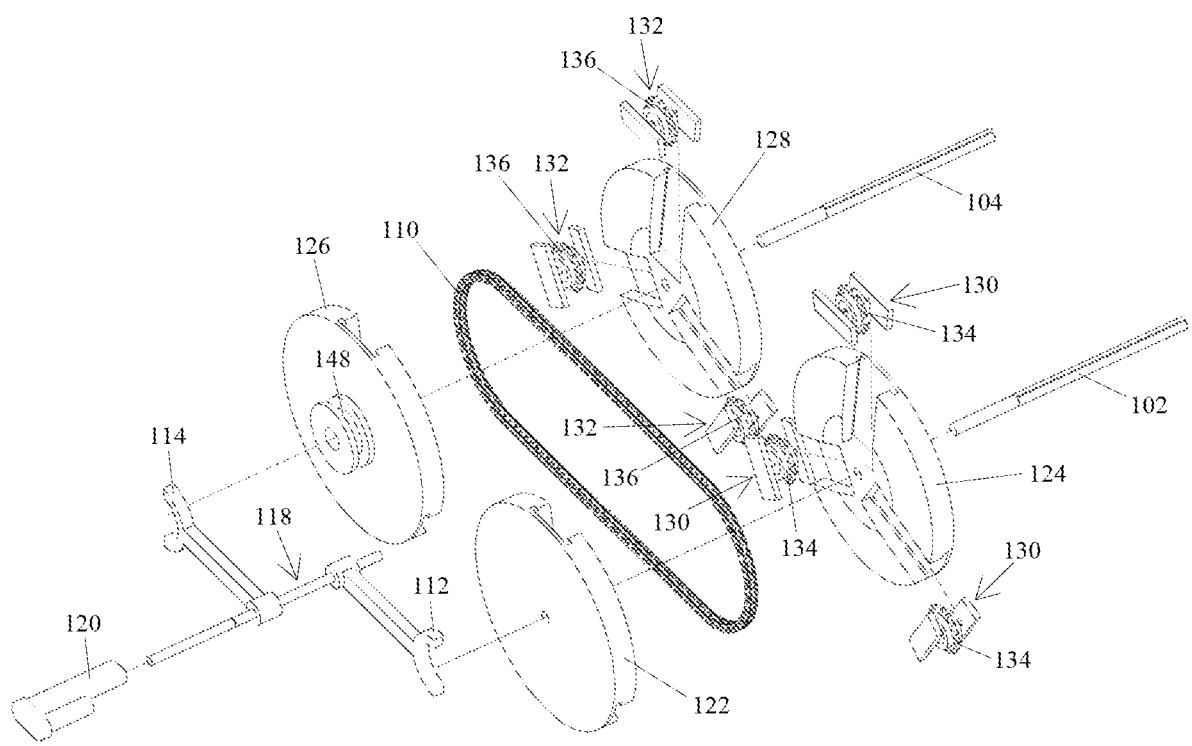
FIG. 2 is an exploded perspective view of the variable transmission.

Referring to FIG. 2, the variable transmission driver axle assembly comprises a driver axle 102 and a pair of driver assembly substantially frustoconical members 122 and 124, with each having a narrower end and a lateral surface having a plurality of radially spaced substantially radially extending guide railing slots 142 (see FIG. 4), mounted and slidable along the driver axle 102, and with the narrower ends facing each other to form a driver assembly. The lateral surfaces of the driver assembly frustoconical members 122 and 124 together form a driver circumferential valley in the space between. The driver valley sides with corresponding guide railing slots 142 oppose each other on each of the driver valley sides, and thus sliding one of the driver assembly frustoconical members 122 and 124 along the driver axle 102 changes separation between the corresponding guide railing slots 142.

Also as shown in FIG. 2, the variable transmission driver axle assembly comprises a driven axle 104 parallel to and spaced apart from the driver axle 102 and a pair of driven assembly substantially frustoconical members 126 and 128, with each having a narrower end and a lateral surface having a plurality of radially spaced substantially radially extending guide railing slots 144 (see FIG. 4), mounted and slidable along the driven axle 104, with the narrower ends facing each other to form a driven assembly. The lateral surfaces of the driven assembly frustoconical members 126 and 128 together form a driven circumferential valley in the space between. The driven valley sides with corresponding guide railing slots 144 oppose each other on each of the driven valley sides, and thus sliding one of the driven assembly frustoconical members 126 and 128 along the driven axle 104 changes separation between the corresponding guide railing slots 144.

The driver circumferential valley and the driven circumferential valley are approximately aligned with each other, as shown in FIG. 3.

Figure 6:
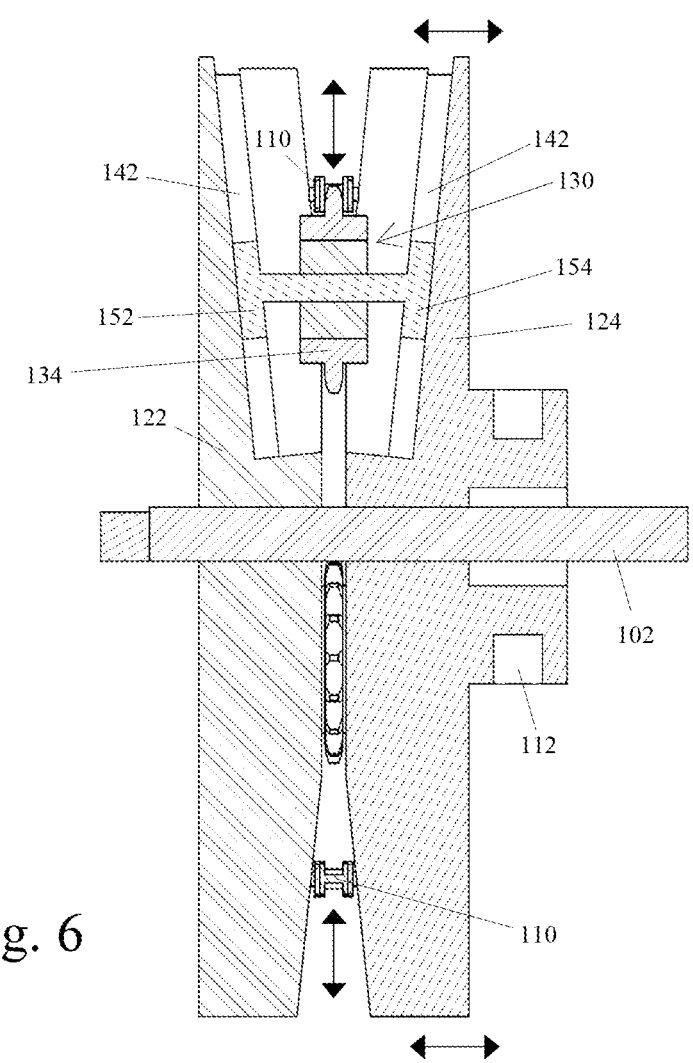
FIG. 6 is a sectional view from the right along the line 6-6 of FIG. 5, wherein the movement abilities of the driver assembly frustoconical member 124, sprocket assemblies 130 and chain 110 are shown.

The variable transmission comprises unidirectional sprocket wheels 134 and 136 having teeth, with each mounted approximately aligned with the circumferential valleys on guide plates 152, 154, 156 and 158 which are receivable in and slidable along the corresponding guide railing slots 142 and 144 when the frustoconical members 122, 124, 126, and 128 slide along the axles, as shown in FIG. 6. As shown in FIG. 7 and FIG. 8, driver axle unidirectional sprocket wheel assemblies 130 comprise a unidirectional sprocket wheel 134 which is mounted on a unidirectional sprocket assembly axle 160 that is located between and fixedly attached to guide plates 152 and 154. Similarly, driven axle unidirectional sprocket wheel assemblies 132 comprise a unidirectional sprocket wheel 136 which is mounted on a unidirectional sprocket assembly axle 162 that is located between and fixedly attached to guide plates 156 and 158.

Figure 4:
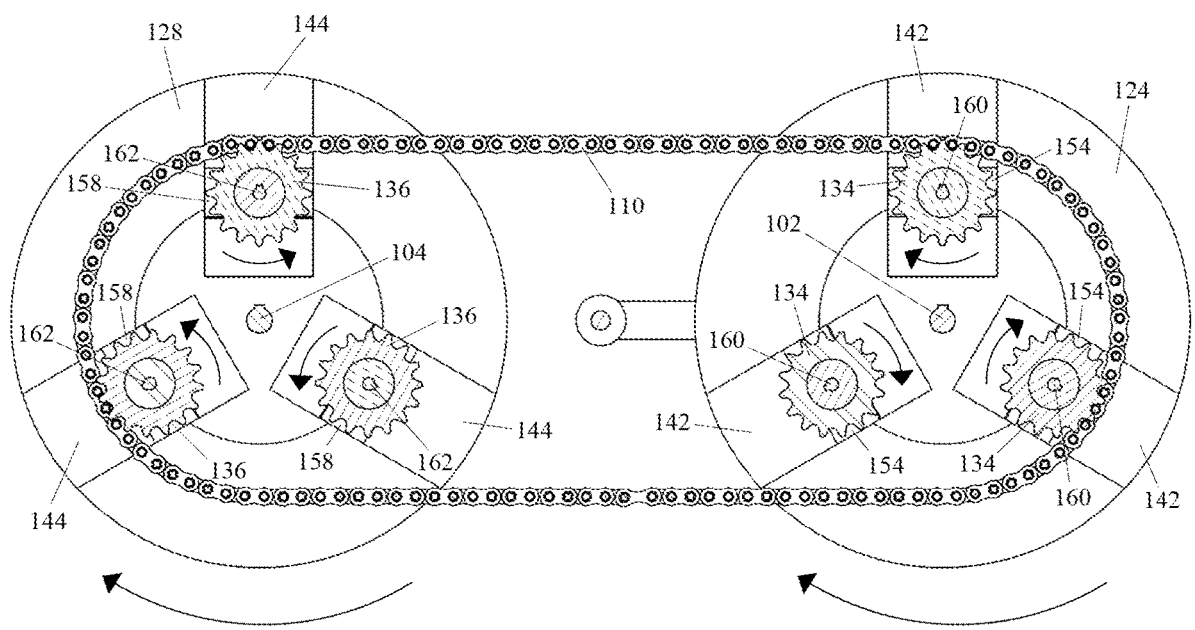
FIG. 4 is a front elevational sectional view along the line 4-4 of FIG. 3 wherein the movements of the assembly mounted around the driver axle 102, the assembly mounted around the driven axle 104, the driver axle assembly unidirectional sprocket wheels 134 and driven axle unidirectional sprocket wheels 136 are shown.

The unidirectional sprocket wheels 134 mounted on the driver assembly rotate only in the same direction as the driver axle 102 and the unidirectional sprocket wheels 136 mounted on the driven assembly rotate only in the opposite direction as the driver axle 102, as shown in FIG. 4.

Axially sliding frustoconical members of one of the assemblies changes separation of the corresponding guide railing slots 142 and 144 on the assembly and causes the guide plates 152, 154, 156 and 158 to slide along the guide railing slots 142 and 144. This changes radial separation between all of the sprocket wheels 134 and 136 mounted on the guide plates 152, 154, 156 and 158 for the assembly, as shown in FIG. 9, FIG. 10, and FIG. 11.

Referring to FIG. 2, the variable transmission comprises unidirectional sprocket wheels 134 and 136 positioned uniformly around the driver axle 102 and driven axle 104. The unidirectional sprocket wheels 134 and 136 can be unidirectional by use of one-way roller clutches, ratchet and pawl mechanisms, sprag clutches, or other unidirectional rotational mechanisms known to the ordinary artisan. The unidirectional sprocket wheels 134 and 136 preferably have teeth and are each slidably mounted on the valley sides of the frustoconical members of the assemblies in order to slide radially, so that axially sliding the frustoconical members in an assembly changes radial separation between all of the sprocket wheels 134 or 136 mounted on the assembly.

The variable transmission preferably also comprises a chain 110 which is engaged with outward facing teeth on the sprocket wheels 134 and 136 that extend radially outward from the circumferential valleys as the sprocket wheels 134 and 136 rotate, as shown in FIG. 4.

The sides of the chain 110 bear against the valley sides and the chain 110 engages only with the radially outward facing teeth of the unidirectional sprocket wheels 134 and 136. The chain 110 forms a substantially circular arc within the circumferential valleys, and the valley sides give shape to the chain 110 and prevent the chain 110 from extending straight from the radially outward facing teeth of one sprocket wheel to the radially outward facing teeth of a neighboring sprocket wheel, even though the radially outward facing section of teeth of the sprocket wheels 134 and 136 are engaged with the chain 110. Thus, vibration from different sprocket wheels sequentially engaging with the chain 110 as the assemblies rotate is reduced.

In addition, as shown in FIG. 1, the variable transmission comprises one or more transmission actuators 120, which can be electric motors, hydraulic fluid pressure systems, pneumatic pressure systems, or other actuators known to the ordinary artisan which are responsible for executing movement and control, and which can be operably connected to the frustoconical members 122, 124, 126, and 128 (see FIG. 3). The transmission actuators 120 simultaneously axially slide the driver assembly frustoconical members 122 and 124 together and apart along the driver axle 102, and axially slide the driven assembly frustoconical members 126 and 128 together and apart along the driven axle 104, in opposite directions. Preferably, this is done by the precise amounts necessary to keep the chain 110 engaged with the teeth of the sprocket wheels 134 and 136 and to keep the length of the chain 110 (that is extended over the radially outward facing section of teeth of the sprocket wheels 134 and 136 that are mounted on both assemblies) adequately constant, in order to maintain engagement of the chain 110 over the radially outward facing section of teeth of the sprocket wheels 134 and 136 as the frustoconical members 122, 124, 126, and 128 are axially slid along the axles 102 and 104 and the sprocket wheels 134 and 136 rotate.

Actuating the transmission actuators 120 changes radial separation of the outward facing section of teeth of the sprocket wheels 134 and 136 for the driver assembly and the driven assembly in opposite directions, preferably by tensioning amounts necessary to maintain adequately constant tension in the chain 110 that is engaged on the radially outward facing section of teeth of the sprocket wheels 134 and 136, as gear ratios between the driver axle 102 and the driven axle 104 are changed.

The use of unidirectional sprocket wheels inherently causes the driver axle 102 and driven axle 104 to rotate during shifting. This is acceptable in applications for a boat, in which slight rotations do not cause substantial problems because the wheels (connected to the driven axle) are not rigidly engaged with a surface. However, certain applications require a precise output power, so it is necessary to compensate for this inherent driving of the axles. If the transmission is used in a land-based automobile for instance, when the vehicle is parked, it is undesirable for gear shifting within the transmission to rotate the axles, which would cause the automobile to move. For these applications, a shift compensator is required, which will counteract this undesirable rotation while the variable transmission is shifting.

A shift compensator can be paired with the driver axle 102 or the driven axle 104, or both axles, and is compensatably, drivably, rotatably connected to an ultimate axle 300, which is an axle that allows for the use of a shift compensator between the variable transmission input power and the variable transmission, or for the use of a shift compensator between the variable transmission output power and the variable transmission, meaning that the shift compensator is compensatably connected to the ultimate axle 300 using a mechanism that compensates and counters the rotations that would occur in the ultimate axle 300 due to the rotations of the driver axle 102 or the driven axle 104 during shifting of the gear ratios between the axles. This shifting can be performed, for example, by a shift fork pushing a gear along a helical axle where the helical axle is engaged with the driver axle 102 or the driven axle 104, and where the gear is also engaged with the ultimate axle 300, thus forcing the gear to turn and counter-rotate the ultimate axle 300 and compensate for undesirable rotation that may occur during shifting of the variable transmission.

The shift compensator preferably employs an actuatable clutch 208, which can be a dry or wet friction clutch, a dog clutch, synchromesh clutch or other mechanical device known to the ordinary artisan that engages and disengages power transmission, to selectively engage and disengage the shift compensator from being drivably, rotatably connected to the driver axle 102 or the driven axle 104, or both based on application needs.

Figure 5:
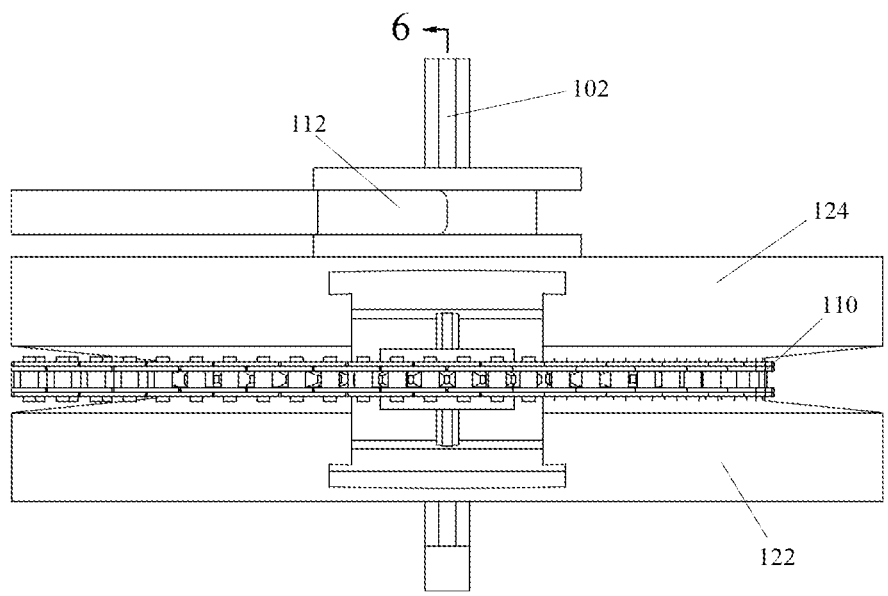
FIG. 5 is a top plan view of the assembly around the driver axle 102 in the variable transmission of the present invention.

As shown in FIG. 5, the sides of the chain 110 bear against the valley sides and the chain 110 engages only with the radially outward facing teeth of the unidirectional sprocket wheels 134 and 136 as the sprocket wheels 134 and 136 rotate. As shown in FIG. 4, the chain 110 forms a substantially circular arc within the circumferential valleys, and the valley sides give shape to the chain 110 and prevent the chain 110 from extending straight from the radially outward facing teeth of one sprocket wheel to the radially outward facing teeth of a neighboring sprocket wheel, even though the radially outward facing section of teeth of the sprocket wheels 134 and 136 are engaged with the chain 110, and thus vibration from different sprocket wheels engaging with the chain 110 as the assemblies rotate is reduced.

In addition, the variable transmission comprises a transmission actuator 120 operably connected to the frustoconical members 122, 124, 126, and 128. The transmission actuator 120 is shown and described as follows as a linear actuator using an electric motor that is paired with a push rod, however the transmission actuator 120 can be an electric motor, hydraulic fluid pressure system, pneumatic pressure system, or other actuator known to the ordinary artisan which is responsible for executing movement and control. The transmission actuator 120 operates a transmission actuator push rod 118, which comprises a driver axle shift fork 112 and a driven axle shift fork 114. As shown in FIG. 3, the driver axle shift fork tines 112 fit into and are paired with a driver axle shift fork receiver 146 which is fixedly attached to the driver assembly frustoconical member 124. The driven axle shift fork tines 114 fit into and are paired with a driven axle shift fork receiver 148 which is fixedly attached to the driven assembly frustoconical member 126. As shown in FIG. 6, the transmission actuator 120 simultaneously axially slides the driver assembly frustoconical members 122 and 124 together and apart along the driver axle 102, and axially slides the driven assembly frustoconical members 126 and 128 together and apart along the driven axle 104, in opposite directions. This is done by precise amounts necessary to keep length of the chain 110 that is extended over the radially facing section of teeth of the sprocket wheels 134 and 136 mounted on both assemblies adequately constant, in order to maintain engagement of the chain 110 over the radially outward facing section of teeth of the sprocket wheels 134 and 136 as the frustoconical members 122, 124, 126, and 128 are axially slid along the axles 102 and 104 and the sprocket wheels 134 and 136 rotate.

As shown in FIG. 4, FIG. 9, FIG. 10, and FIG. 11, actuating the transmission actuator 120 changes radial separation of the outward facing section of teeth of the sprocket wheels 134 and 136 for the driver assembly and the driven assembly in opposite directions by tensioning amounts necessary to maintain adequately constant tension in the chain 110 that is engaged on the radially outward facing section of teeth of the sprocket wheels 134 and 136, as gear ratios between the driver axle 102 and the driven axle 104 are changed.

As shown in FIG. 1, a shift compensator is paired with the transmission in order to compensate for undesirable rotations during shifting of the variable transmission.

The shift compensator preferably employs an actuatable clutch 208, to selectively engage and disengage the shift compensator from being drivably, rotatably connected to the driven axle 104. While the shift compensator is described as follows being paired with the driven axle 104, in variations of the embodiment the shift compensator and thus the actuatable clutch 208 can be paired with the driver axle 102 or the driven axle 104, or both the driver axle 102 and the driven axle 104 can have a complimentary shift compensator as desired.

The actuatable clutch 208 is operably actuated to the engaged or disengaged position by a clutch actuator 214 which is shown and described as follows as a linear actuator using an electric motor that is paired with a push rod, however the clutch actuator 214 can be an electric motor, hydraulic fluid pressure system, pneumatic pressure system, or other actuator known to the ordinary artisan which is responsible for executing movement and control. The clutch actuator 214 actuates a clutch actuation shift fork push rod 262 which comprises a clutch actuation shift fork 212. The tines of the clutch actuation shift fork 212 are received by a clutch shift fork receiver 210 which is fixedly attached to the actuatable clutch 208.

When in the engaged position the actuatable clutch 208 butts up against a clutch receiving plate 206 which is fixedly mounted on and drivably, rotatably connected to the driven axle 104. The shift compensator is also compensatably, drivably, rotatably connected to the ultimate axle 300.

Figure 12:
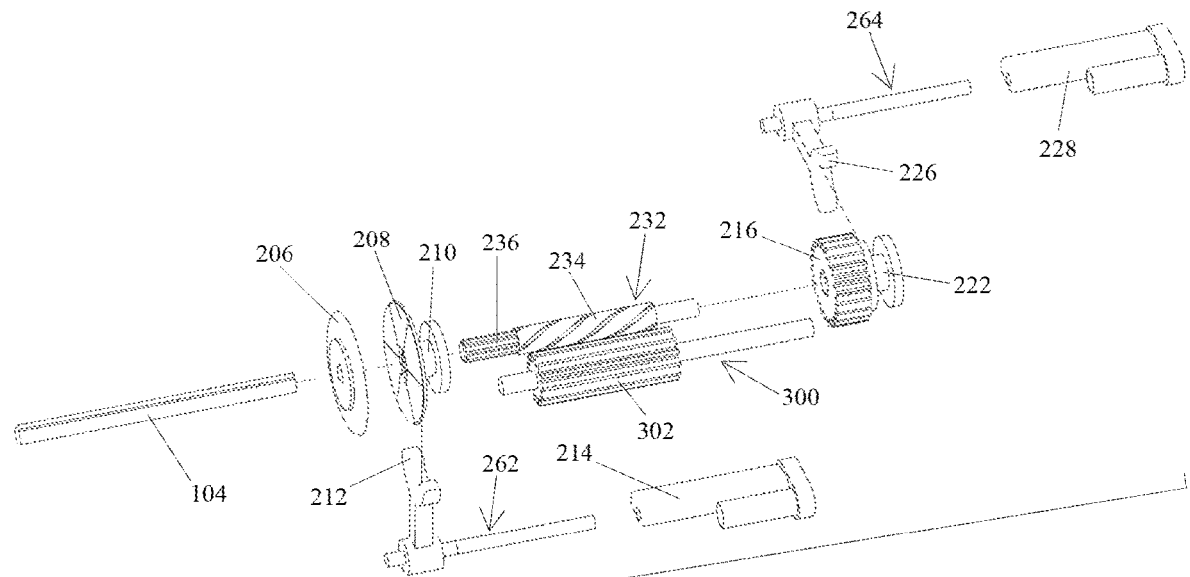
FIG. 12 is an exploded perspective view of a presently preferred embodiment of a shift compensator according to the present invention.

As shown in FIG. 12, the shift compensator comprises a primary axle 232, having a segment with helical grooves 234, drivably rotatably connected to the actuatable clutch 208, and a helically slidable gear 216 having helical splines complementary to the helical grooves 234, mounted on the primary axle 232 and helically slidably engaged with the helical grooves 234, and also axially slidable along, and rotatably driving, the ultimate axle 300. The teeth of the helically slidable gear 216 mesh with an ultimate axle grooved segment 302 which is preferably integrally formed, however the ultimate axle grooved segment 302 can be integrally formed teeth, grooves, or an interposing second gear mounted on and rotationally paired with the ultimate axle 300 can be used to select gear ratio or provide efficient means of power transfer.

Rotating the primary axle 232 helically slides the helically slidable gear 216 axially along the helical grooves 234 of the primary axle 232 and vice versa.

The primary axle 232 also comprises a clutch-receiving grooved segment 236 upon which the actuatable clutch 208 is mounted, where the actuatable clutch 208 has complimentary grooves which are received by the clutch-receiving grooved segment 236 of the primary axle 232 so that the actuatable clutch 236 rotatably drives and is rotatably driven by the primary axle 232.

Also shown in FIG. 12, a compensating actuator 228 helically slides the helically slidable gear 216 along the helical grooves 234 of the primary axle 232. The compensating actuator 228 is shown and described as follows as a linear actuator using an electric motor that is paired with a push rod, however the compensating actuator 228 can be an electric motor, hydraulic fluid pressure system, pneumatic pressure system, or other actuator known to the ordinary artisan which is responsible for executing movement and control. The compensating actuator 228 actuates a compensator shift fork push rod 264 which comprises a shift compensator shift fork 226. The tines of the shift compensator shift fork 226 are received by the compensator shift fork receiver 222 which is fixedly attached to the helically slidable gear 216.

The shift compensator also comprises a compensating controller 350 controllably connected to the compensating actuator 228, as shown in FIG. 1.

Figure 13:
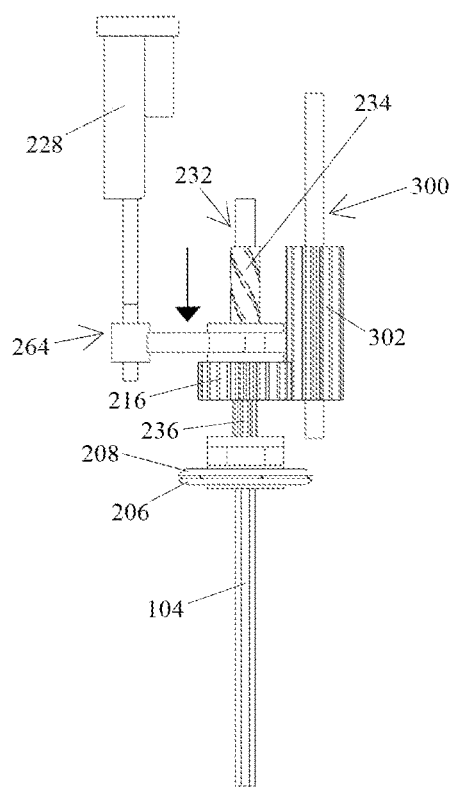
FIG. 13 is a top plan view of the shift compensator. Actuated movements of the compensator shift fork push rod 264 and the helically slidable gear 216 are shown.

As shown in FIG. 13, when the actuatable clutch 208 engages the driven axle 104 with the shift compensator, the compensating controller 350 causes the compensating actuator 228 to helically slide the helically slidable gear 216 along the helical grooves 234 as desired to absorb rotation of the driver axle 102 and the driven axle 104 due to the shifting of the gear ratios between the axles, while maintaining positive rotational engagement with the driven axle 104, and with the ultimate axle 300.

Figure 14:
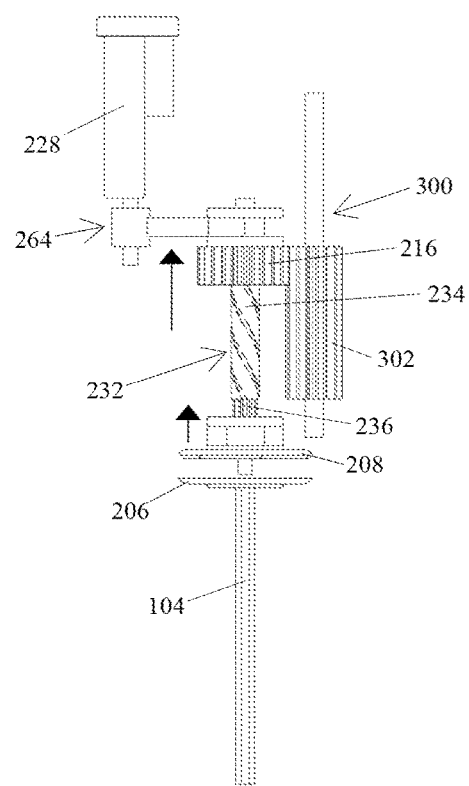
FIG. 14 is a top plan view of the embodiment of FIG. 13. Actuated movements of the compensator shift fork push rod 264, the helically slidable gear 216, and the actuatable clutch 208 are shown.

When the helically slidable gear 216 has reached a designated end point along the helical grooves 234, in order to allow the shift compensator to reset and continue further functionality, the helically slidable gear 216 can be returned to a designated starting point along the helical grooves 234. As shown in FIG. 14, this can be accomplished by disengaging the actuatable clutch 208 from the clutch receiving plate 206, and thus the primary axle 232 is no longer rotationally, drivably paired with the driven axle 104. The helically slidable gear 216 can then slide to a designated starting point along the primary axle segment with helical grooves 234 without collaterally rotationally driving the driven axle 104.

It is to be understood that the embodiment which will be subsequently described is but one of a number of possible implementations of the shift compensation method of the present invention. Other embodiments can include separate hardware for controlling each of the different positioning, measuring, and movement sequences.

The presently preferred method for measuring the rotation of the shift compensator to counteract will now be described.
1. Lock the rotation of whichever of the driver axle 102 or driven axle 104 is not connected to the primary axle 232 of the shift compensator.
2. Maintain the position of the helically slidable gear 216 along the primary axle segment with helical grooves 234.
3. Maintain the actuatable clutch 208 in the engaged position, butting up against the clutch receiving plate 206.
4. Shift the gear ratio from the lowest desired gear ratio to the highest desired gear ratio and constantly measure the position of the transmission actuator 120 in the variable transmission while simultaneously constantly measuring the rotational position of the ultimate axle 300.
5. The aforementioned steps will give data on the position of the transmission actuator 120 and the corresponding rotation of the ultimate axle 300 as the gear ratio is changed.

Transmission measurements will give data for the number of undesirable rotations of the ultimate axle 300 that will occur as a result of shifting the variable transmission from a given first position to a given second position in order to optimally shift gear ratios within the variable transmission.

The presently preferred method for measuring the amount of compensation will now be described.
1. Lock the rotation of the primary axle 232.
2. Use compensating actuator 228 to helically slide the helically slidable gear 216 along the primary axle segment with helical grooves 234 to cause counter-rotation of the ultimate axle 300.
3. Measure the amount of rotation of the ultimate axle 300 with respect to distance traveled along the primary axle segment with helical grooves 234 by the helically slidable gear 216.
Given a helical grooved segment of axle that employs a consistent helical twist along the length of the primary axle segment with helical grooves 234, the shift compensation measurements give data for the number of counter-rotations of the ultimate axle 300 per given distance that the helically slidable gear 216 helically slides along the length of the primary axle segment with helical grooves 234.

Configuration of the shift compensator will now be described.

Program a controller 350 to control the compensating actuator 228 to counter-rotate the ultimate axle 300 by the correct number of counter-rotations of the ultimate axle 300 to compensate for the number of undesirable rotations of the ultimate axle 300 at a particular gear ratio when changing gear ratios, and program the controller 350 to apply the variable transmission measurements and the shift compensation measurements to commands that are given to the compensating actuator 228.

The controller 350 preferably consists of electronic circuitry that executes instructions comprising a computer program, the hardware of which includes one or more central processing units and which performs arithmetic, logic, and controlling operations specified by the instructions in the computer program. The controller 350 can be a general-purpose microcomputer, dedicated microprocessor or other computer or computer processor known to the ordinary artisan. The controller 350 can have integrated or separate electronic circuitry for electronic operations to supplement controller operations, such as amplifying electronic signals and interfacing between the controller 350 and actuators used in the variable transmission and the shift compensator. The controller 350 passes positional data over, gives commands or input power over, and receives the measurements and output power of the transmission actuator 120 and compensating actuator 228 via line 310 and line 320. Line 310 and line 320 comprise data carriers such as cables or wireless signals.

When a gear ratio shift is desired, the current position is noted and the desired position is noted. When the shift executes, the controller 350 will note these parameters and feed this positional change data to the compensating actuator 228 which will simultaneously operate.

The controller 350 receives positional change data of the variable transmission, and based on the measurements from the variable transmission and shift compensator, simultaneously directs the compensating actuator 228 to actuate the helically slidable gear 216 the correct calculated distance along the primary axle segment with helical grooves 234 to cause the ultimate axle 300 to counter-rotate an equal or greater amount than the amount of rotation that will predictably occur according to the positional change data of the variable transmission.

The invention has been described above with respect to a particular preferred embodiment, however, it will be appreciated by those skilled in the art that many modifications and variations can be made without departing from the spirit and scope of the invention. Various modifications and deviations are as follows.

An alternative embodiment as described above wherein the embodiment comprises unidirectional structurally engageable wheels positioned uniformly around the driver axle 102 and driven axle 104. The unidirectional structurally engageable wheels are each slidably mounted on the valley sides of the frustoconical members of the assemblies in order to slide radially, so that axially sliding the frustoconical members in an assembly changes radial separation between all of the structurally engageable wheels mounted on the assembly.

The unidirectional structurally engageable wheels mounted on the driver assembly rotate only in the same direction as the driver axle 102 and the unidirectional structurally engageable wheels mounted on the driven assembly rotate only in the opposite direction as the driver axle 102.

The alternative embodiment also comprises a structurally engageable belt, structurally engaged with engagement portions of the structurally engageable wheels that extend radially outward from the circumferential valleys as the unidirectional structurally engageable wheels rotate.

The belt sides bear against the valley sides and the belt engages only with radially outward of the engagement portions of the unidirectional structurally engageable wheels as the unidirectional structurally engageable wheels rotate. The belt forms a substantially circular arc within the circumferential valleys, and the valley sides give shape to the belt and prevent the belt from extending straight from the radially outward of the engagement portions of one structurally engageable wheel to the radially outward of the engagement portions of a neighboring structurally engageable wheel, even though the radially outward facing section of the engagement portions of the structurally engageable wheels are engaged with the belt, and thus vibration from different structurally engageable wheels engaging with the belt as the assemblies rotate is reduced.

The alternative embodiment also comprises one or more transmission actuators 120 operably connected to the frustoconical members 122, 124, 126, and 128. The transmission actuators 120 simultaneously axially slide the driver assembly frustoconical members 122 and 124 together and apart along the driver axle 102 and axially slide the driven assembly frustoconical members 126 and 128 together and apart along the driven axle 104, in opposite directions. This is done by precise amounts necessary to keep the length of the belt extended over the radially outward facing section of the engagement portions of the structurally engageable wheels mounted on both assemblies adequately constant, in order to maintain engagement of the belt over the radially outward facing section of the engagement portions as the frustoconical members 122, 124, 126, and 128 are axially slid along the axles 102 and 104 and the unidirectional structurally engageable wheels rotate.

Actuating the transmission actuators 120 changes radial separation of the outward facing section of the engagement portions of the structurally engageable wheels for the driver assembly and the driven assembly in opposite directions by tensioning amounts necessary to maintain adequately constant tension in the belt that is engaged on the radially outward facing section of the engagement portions of the unidirectional structurally engageable wheels, as gear ratios between the driver axle 102 and the driven axle 104 are changed.

According to the parameters described in the above sections, another embodiment can be utilized wherein the structurally engageable belt, the engagement portions, and the structurally engageable wheel are selected from the group consisting of a belt having teeth and wheels having holes complementary to the teeth to receive and engage with the teeth, and a chain having links and sprocket wheels having teeth complementary to the links to receive and engage with the links.

Figure 15:
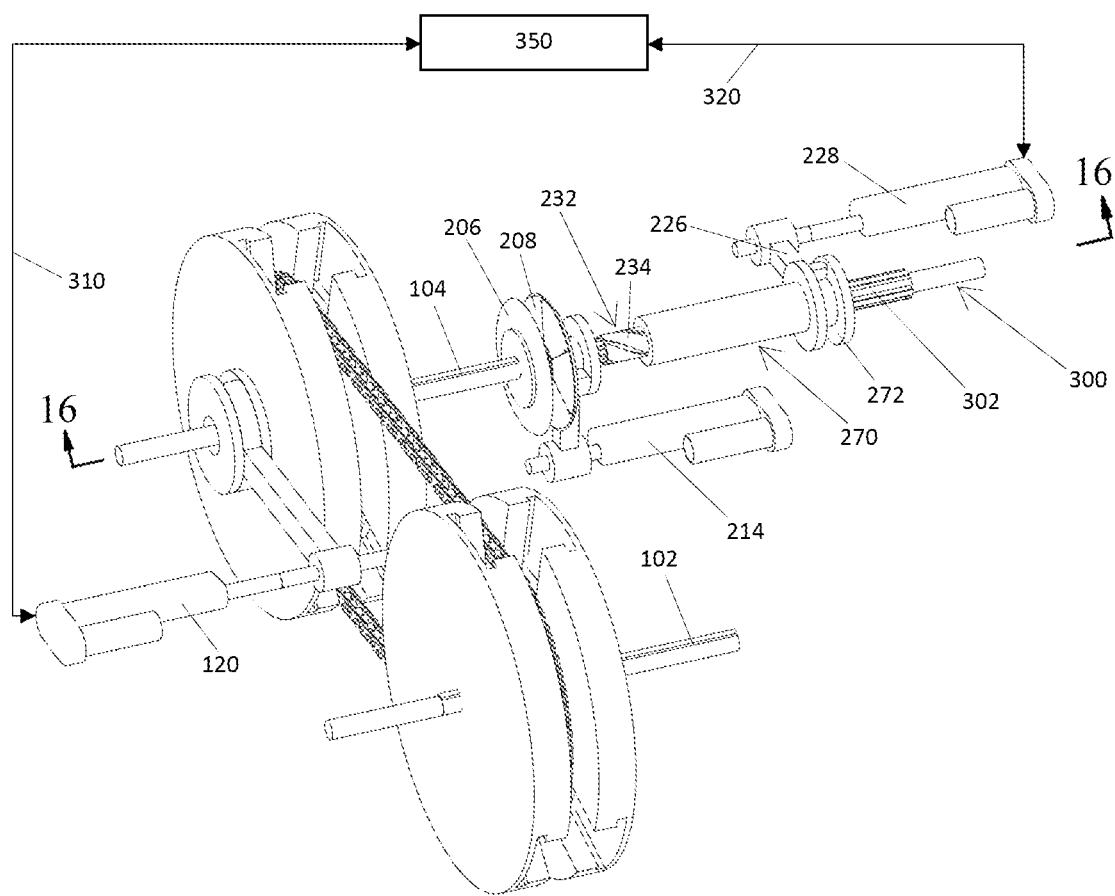
FIG. 15 is an assembled perspective view of an alternative to the preferred embodiment which comprises a helically slidable cylinder 270.
Figure 16:
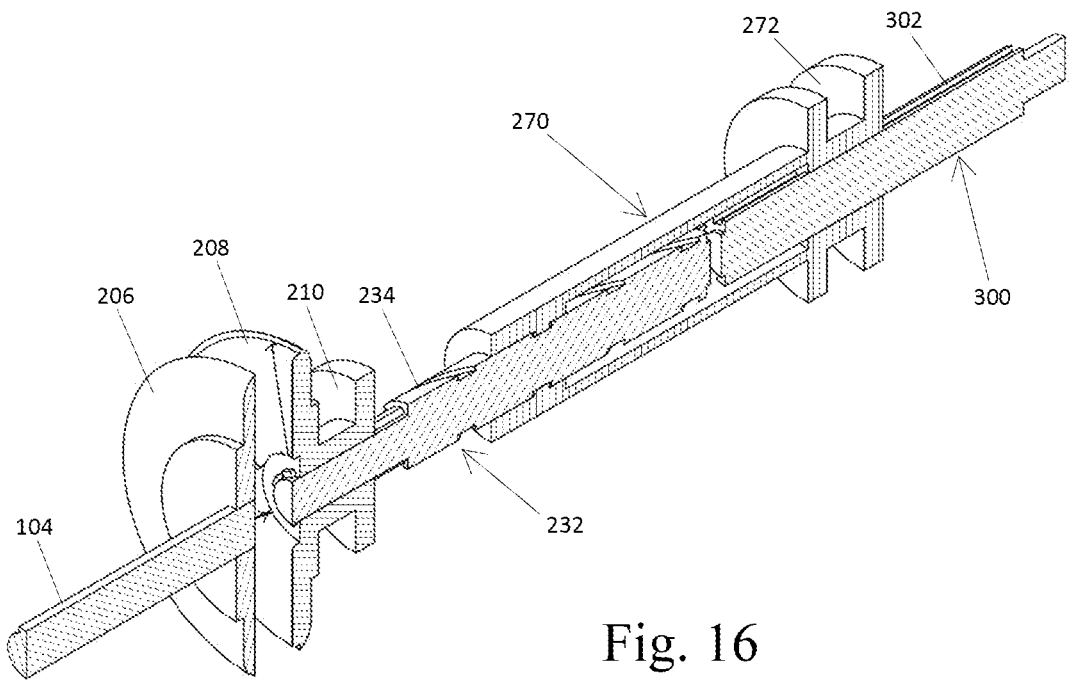
FIG. 16 is a right sectional view along the line 16-16 wherein the shift compensator of the alternative to the preferred embodiment which comprises a helically slidable cylinder 270 is shown.
Figure 17:
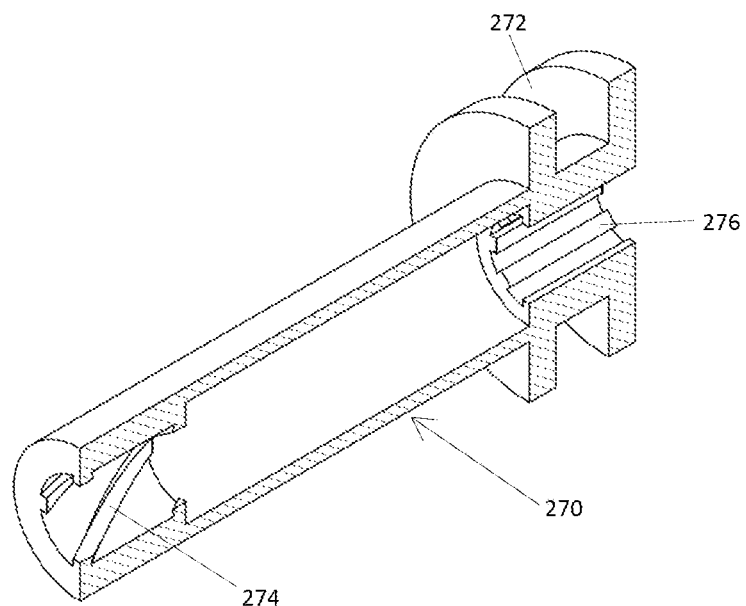
FIG. 17 is a right sectional view of the helically slidable cylinder 270.

As seen in FIG. 15 and FIG. 16, another alternate embodiment of the shift compensator can be utilized, wherein the shift compensator instead comprises a primary axle 232, having a segment with helical grooves 234, drivably rotatably connected to the actuatable clutch 208 and a helically slidable cylinder 270 having helical splines 274 complementary to the helical grooves 234, mounted on the primary axle 232 and helically slidably engaged with the helical grooves 234, and also axially slidable along, and rotatably driving, the ultimate axle 300. FIG. 17 shows an example of an embodiment where the helically slidable cylinder 270 has helical splines 274 which are complimentary to the helical grooves 234, as well as grooves 276 which are complimentary to the ultimate axle grooves 302, which can also be seen in FIG. 16.

The helically slidable cylinder 270 in this example embodiment also comprises a shift fork receiver 272 which is fixedly attached to the helically slidable cylinder 270 and receives the tines of the shift compensator shift fork 226.

Rotating the primary axle 232 helically slides the helically slidable cylinder 270 axially along the helical grooves 234 of the primary axle 232 and vice versa.

A compensating actuator 228 helically slides the helically slidable cylinder 270 along the helical grooves 234 of the primary axle 232.

The alternate embodiment also comprises a compensating controller 350 controllably connected to the compensating actuator 228.

When the actuatable clutch 208 engages the driver axle 102 or the driven axle 104 with the shift compensator, the compensating controller 350 causes the compensating actuator 228 to helically slide the helically slidable cylinder 270 along the helical grooves 234 as desired to absorb rotation of the driver axle 102 or the driven axle 104 due to the shifting of the gear ratios between the axles, while maintaining positive rotational engagement between the driver axle 102 or the driven axle 104, and with the ultimate axle 300.

Figure 18:
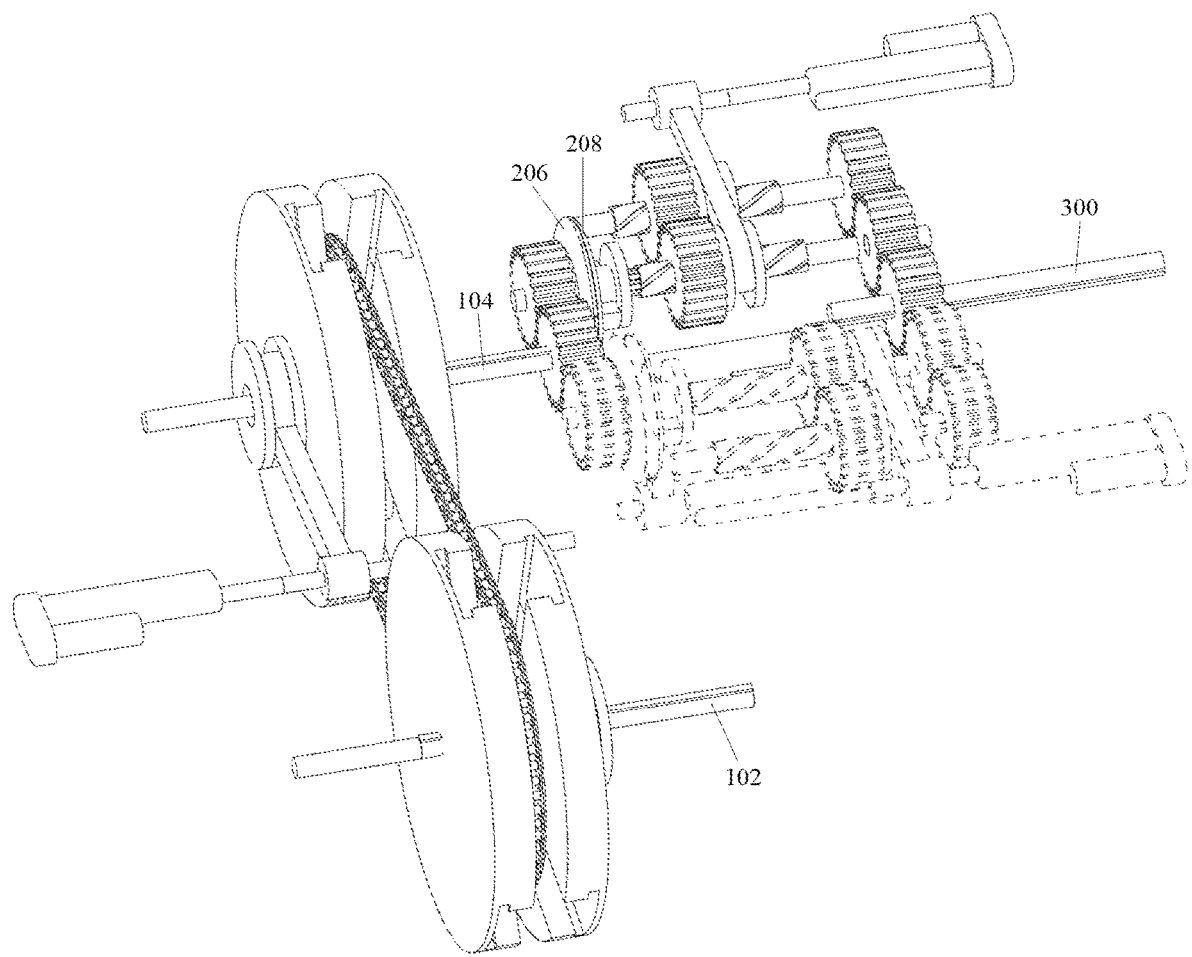
FIG. 18 is an assembled perspective view of an alternative to the preferred embodiment which comprises two helical axles within the shift compensator and also shows an alternate embodiment which includes a mirror image of a shift compensator which comprises two helical axles.

Another alternate embodiment is as shown in FIG. 18. While only one helical groove axle is required within the shift compensator, the implementation of two helical axles allows for the shift compensator to compensate for more excess rotation within the same volume.

The dotted lines in FIG. 18 also demonstrate an alternate embodiment to the shift compensator which adds another mirror-image side of the shift compensator which can allow for the shift compensator to maintain constant positive engagement and function while the other side of the shift compensator resets, as previously described and shown in FIG. 14.

Figure 21:
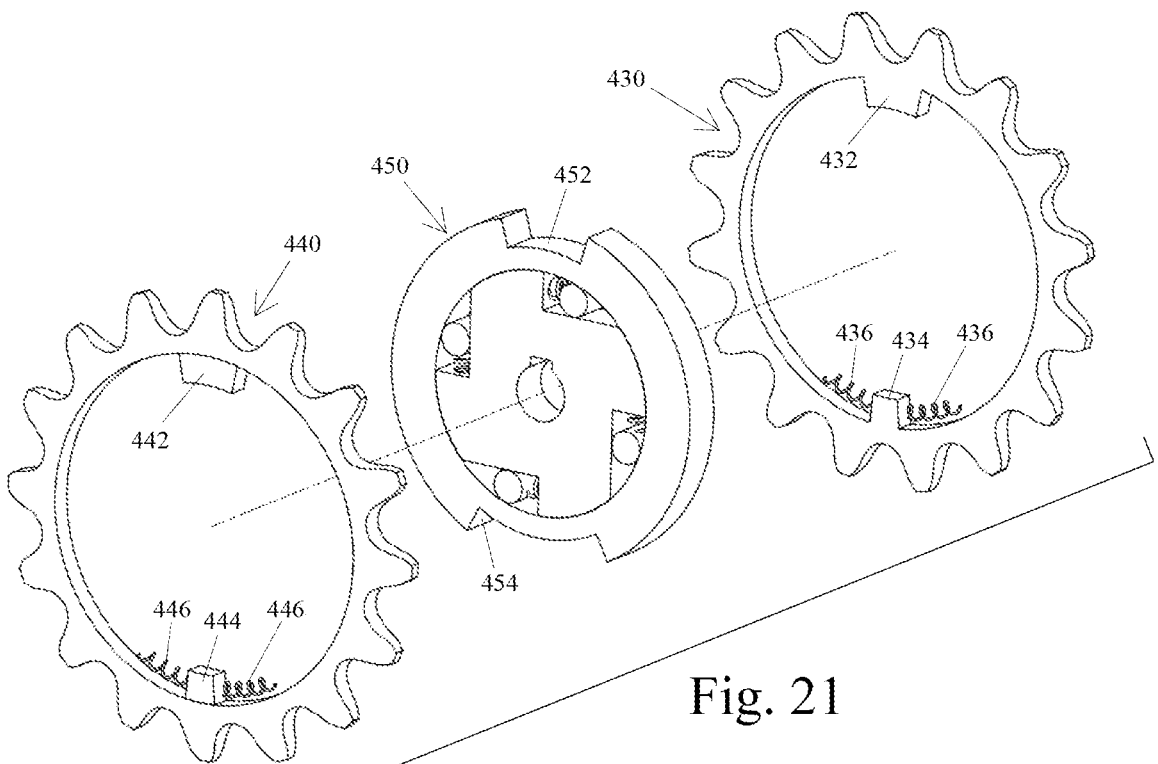
FIG. 21 shows an exploded perspective view of an alternative embodiment of the unidirectional sprocket wheels which comprises the coaxial wheelets 430 and 440. Best Mode for Carrying Out the Invention.

As shown in FIG. 21, another alternate embodiment is as described above wherein at least one of the unidirectional sprocket wheels comprises multiple coaxial wheelets 430 and 440, with each having engagement portions which can be teeth, ridges, grooves, or other engageable structures known to the ordinary artisan for the purpose of structural engagement with a chain or belt, and with the wheelets 430 and 440 being rotatable with respect to each other by at least an offset distance between neighboring engagement portions on the gears. The engagement portions on at least some of the wheelets 430 and 440 are biased to be rotationally offset from the engagement portions of others of the wheelets 430 and 440 by at most half of the offset distance. Additionally, when the links on the chain or belt engage with the engagement portions on the wheelets 430 and 440, the wheelets 430 and 440 overcome the bias and the wheelets 430 and 440 rotate until the engagement portions become significantly aligned.

FIG. 21 shows an example of this alternate embodiment in which the unidirectional sprocket wheels comprise two coaxial wheelets 430 and 440 which structurally engage with and receive the chain 110. As shown in FIG. 21, the coaxial wheelets 430 and 440 are mounted on a sprocket base 450 and are positioned where the coaxial wheelets 430 and 440 are in a rotationally offset position on the sprocket base 450 with respect to each other. While the sprocket base 450 is shown in FIG. 21 to be unidirectional by the employment of a roller clutch, the sprocket base 450 can be unidirectional by use of one-way roller clutches, ratchet and pawl mechanisms, sprag clutches, or other unidirectional rotational mechanisms known to the ordinary artisan. The coaxial wheelets 430 and 440 each comprise a rotation limiter 432 and 442, which allow for limited rotation of the coaxial wheelets 430 and 440 with respect to the sprocket base 450. While FIG. 21 shows the rotation limiters 432 and 442 to be protruded teeth, the rotation limiter can be a single or set of protrusions, splines, ridges, indentations, or other structurally engageable member which interacts with the sprocket base 450 by structural engagement, providing limited and finite rotation of the coaxial wheelets 430 and 440 with respect to the sprocket base 450. As seen in FIG. 21, the rotation limiters 432 and 442 are fixedly attached to the coaxial wheelets 430 and 440 and are received by a sprocket base limiter receiver 452.

Figure 19:
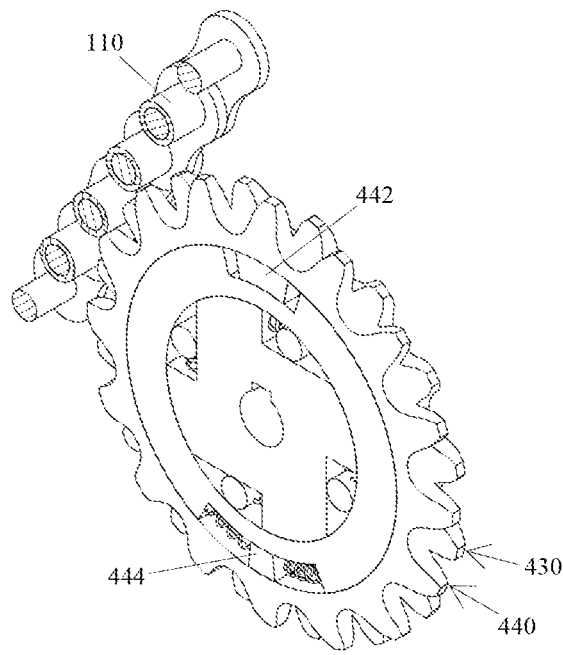
FIG. 19 shows an assembled perspective view of an alternative embodiment of the unidirectional sprocket wheels which comprises the coaxial wheelets 430 and 440, and which shows a sectional view of the chain 110. Wheelets are multiple narrow wheels having the same diameter that, when mounted coaxially, parallel, and abutting each other, combine to function as a single wheel.
Figure 20:
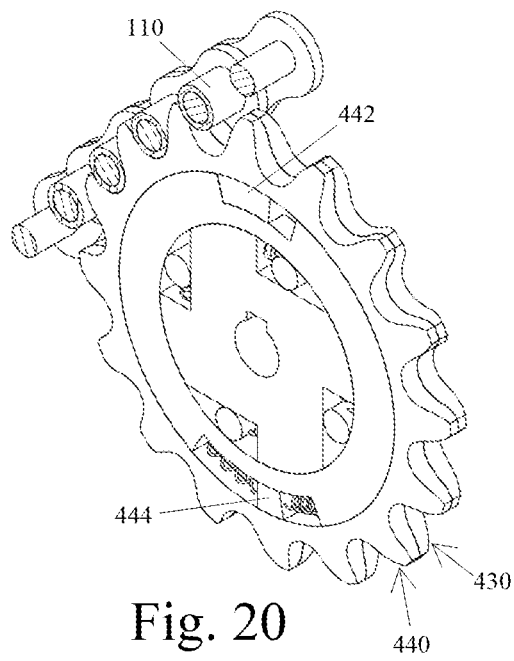
FIG. 20 shows an assembled perspective view of an alternative embodiment of the unidirectional sprocket wheels which comprises the coaxial wheelets 430 and 440, and which shows a sectional view of the chain 110.

As shown in FIG. 19, when not engaged by the chain 110, the coaxial wheelets 430 and 440 are held in a default offset configuration by rotation stabilizers 434 and 444 which are received by a sprocket base stabilizer receiver 454 and are stabilized by the use of rotation stabilization springs 436 and 446. While this embodiment and FIG. 21 describes and shows the rotation stabilizers 434 and 444 as being protrusions with paired springs, alternative embodiments can employ rotation stabilizers that use springs, flexible bands, flexible cushions, shock absorbers, variable tensioners, or other devices designed to allow for a range of motion while returning to a default position. As shown in FIG. 20, when the chain 110 meshes with the coaxial wheelets 430 and 440, the chain 110 pushes the coaxial wheelets 430 and 440 in opposite rotational directions and causes one or more of the rotational limiters 432 and 442 to butt up against the sides of the sprocket base limiter receiver 452, thus allowing the unidirectional sprocket wheel to engage optimally with the chain 110 as the unidirectional sprocket wheels come into contact with the chain 110, and also allow for the unidirectional sprocket wheels to be substantially unidirectional after the chain 110 is fully engaged with the coaxial wheelets 430 and 440.

Industrial Applicability.

The present invention is applicable whenever it is desired to provide a low vibration continuously variable transmission with high torque that is not dependent on friction.

What is claimed is:

1. A continuously variable transmission, comprising:
   a driver axle;
   a pair of driver assembly substantially frustoconical members, each having a narrower end and a lateral surface, coaxially mounted and axially slidable on said driver axle, with said narrower ends facing each other to form a driver assembly, whereby said lateral surfaces of said driver frustoconical members define a driver circumferential valley therebetween, having driver valley sides, whereby axially sliding one of said driver assembly frustoconical members along said driver axle changes separation of said driver valley sides;
   a driven axle parallel to and spaced apart from said driver axle;
   a pair of driven assembly substantially frustoconical members, each having a narrower end and a lateral surface, coaxially mounted and axially slidable on said driven axle, with said narrower ends facing each other to form a driven assembly, whereby said lateral surfaces of said driven frustoconical members define a driven circumferential valley therebetween, having driven valley sides, whereby axially sliding one of said driven assembly frustoconical members along said driven axle changes separation of said driven valley sides;
   wherein said driver circumferential valley and said driven circumferential valley are approximately coplanar;
   a plurality of radially spaced unidirectional sprocket wheels having teeth, each having a wheel diameter and each slidably mounted on said valley sides of said frustoconical members of said assemblies to slide substantially radially, so that axially sliding said frustoconical members in an assembly changes radial separation between all of said sprocket wheels mounted on said assembly;
   wherein said unidirectional sprocket wheels mounted on said driver assembly rotate only in the same direction as said driver axle and said unidirectional sprocket wheels mounted on said driven assembly rotate only in the opposite direction as said driver axle;
   a chain made of interlocking movable links having a chain length, and chain sides defining a chain width, said links receivable and engageable with radially outward of said teeth on said sprocket wheels that extend radially outward from said circumferential valleys as said sprocket wheels rotate;
   wherein said chain sides bear against and engage said valley sides and said links of said chain engage with said radially outward of said teeth of said unidirectional sprocket wheels, whereby said chain forms a substantially circular arc within said circumferential valleys and said valley sides prevent said chain from extending straight from said radially outward of said teeth of one sprocket wheel to said radially outward of said teeth of an adjacent sprocket wheel, even though said radially outward of said teeth of said sprocket wheels are engaged with said links of said chain, whereby vibration from different sprocket wheels engaging with said chain as said assemblies rotate is reduced;
   transmission actuators operably connected to said frustoconical members to simultaneously axially slide said frustoconical members in said driver assembly together and apart along said driver axle and axially slide said frustoconical members in said driven assembly together and apart along said driven axle, in opposite directions by engagement-maintaining amounts necessary to keep length of said chain extending over said radially outward of said teeth of said sprocket wheels mounted on both assemblies substantially constant, in order to maintain engagement of said chain over said radially outward of said teeth as said frustoconical members are axially slid along said axles and said sprocket wheels rotate;
   whereby actuating said transmission actuators changes radial separation of said radially outward of said teeth of said sprocket wheels for said driver assembly and said driven assembly in opposite directions by tensioning amounts necessary to maintain substantially constant tension in said chain while said links are engaged on said radially outward of said teeth, as gear ratios between said driver axle and said driven axle are changed;
   further comprising:
   a shift compensator compensatably drivably rotatably connected to an ultimate axle, to compensate for rotation of said ultimate axle due to rotation of said driver axle or said driven axle due to shifting of said gear ratios between said axles; and
   an actuatable clutch to selectively engage and disengage said shift compensator from being drivably rotatably connected to at least one of said driver axle and said driven axle.

2. A continuously variable transmission according to claim 1, wherein said shift compensator comprises:
   a primary axle, having a segment with helical grooves, drivably rotatably connected to said actuatable clutch;
   a helically slidable gear having helical splines complementary to said helical grooves, mounted on said primary axle and helically slidably engaged with said helical grooves, and also axially slidable along, and rotatably driving, said ultimate axle;

wherein rotating said primary axle helically slides said helically slidable gear axially along said helical grooves of said primary axle and vice versa;

a compensating actuator to helically slide said helically slidable gear along said helical grooves of said primary axle;

a compensating controller controllably connected to said compensating actuator;

whereby, when said actuatable clutch engages at least one of said driver axle and said driven axle with said shift compensator, said compensating controller causes said compensating actuator to helically slide said helically slidable gear along said helical grooves to absorb rotation of one of said driver axle and said driven axle due to said shifting of said gear ratios between said axles, while maintaining positive rotational engagement between said driver axle or said driven axle, and with said ultimate axle.

3. A continuously variable transmission according to claim 1, wherein said shift compensator comprises:

a primary axle, having a segment with helical grooves, drivably rotatably connected to said actuatable clutch;

a helically slidable cylinder having helical splines complementary to said helical grooves, mounted on said primary axle and helically slidably engaged with said helical grooves, and also axially slidable along, and rotatably driving, said ultimate axle;

wherein rotating said primary axle helically slides said helically slidable cylinder axially along said helical grooves of said primary axle and vice versa;

a compensating actuator to helically slide said helically slidable cylinder along said helical grooves of said primary axle;

a compensating controller controllably connected to said compensating actuator;

whereby, when said actuatable clutch engages at least one of said driver axle and said driven axle with said shift compensator, said compensating controller causes said compensating actuator to helically slide said helically slidable cylinder along said helical grooves to absorb rotation of one of said driver axle and said driven axle due to said shifting of said gear ratios between said axles, while maintaining positive rotational engagement between said driver axle or said driven axle, and with said ultimate axle.

\* \* \* \* \*